(12) United States Patent
Scherer

(10) Patent No.: US 12,168,481 B1
(45) Date of Patent: Dec. 17, 2024

(54) CAB SYSTEM WITH MATERIAL DEFLECTION PLATFORM FOR WORK MACHINES

(71) Applicant: Caterpillar Inc., Peoria, IL (US)

(72) Inventor: Karl Welby Scherer, Decatur, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/325,296

(22) Filed: May 30, 2023

(51) Int. Cl.
*B62D 33/06* (2006.01)
*B60P 1/04* (2006.01)

(52) U.S. Cl.
CPC ............ *B62D 33/0617* (2013.01); *B60P 1/04* (2013.01)

(58) Field of Classification Search
CPC ............................... B62D 33/0617; B60P 1/04
See application file for complete search history.

(56) References Cited

U.S. PATENT DOCUMENTS

| | | | | |
|---|---|---|---|---|
| 176,700 A * | 4/1876 | Sible | ........................ | B60P 1/04 298/7 |
| 270,905 A * | 1/1883 | Eckstein | ................... | B60P 1/04 298/5 |
| 1,354,817 A * | 10/1920 | Fragner | ..................... | B60P 1/04 298/7 |
| 3,412,883 A * | 11/1968 | Birdsall | .................... | B60P 1/36 298/7 |
| 3,700,283 A * | 10/1972 | Birdsall | .................... | B60P 1/04 298/7 |
| 4,416,486 A * | 11/1983 | McNaught | ......... | B62D 33/0617 180/89.12 |
| 4,917,125 A * | 4/1990 | Midkiff | ................... | B60S 3/042 134/123 |
| 5,154,488 A * | 10/1992 | Maxon, III | ............... | B60P 3/16 298/7 |
| 6,851,717 B1 * | 2/2005 | Andersen | ............... | B62D 25/18 280/847 |
| 7,350,872 B2 * | 4/2008 | Wood | ...................... | B60P 1/283 298/18 |
| 7,549,260 B2 * | 6/2009 | Shepherd | ................ | B23P 15/12 403/364 |
| 11,518,206 B2 * | 12/2022 | Harmon | ................... | B60K 1/04 |

(Continued)

FOREIGN PATENT DOCUMENTS

| CN | 105711654 | 6/2016 |
|---|---|---|
| CN | 210878262 U | 6/2020 |

(Continued)

OTHER PUBLICATIONS

Written Opinion and International Search Report for Int'l. Patent Appln. No.PCT/US2024/013910, mailed Aug. 8, 2024 (9 pgs).

*Primary Examiner* — Paul N Dickson
*Assistant Examiner* — Shams Dhanani

(57) ABSTRACT

A cab system for a work machine includes an operator cab and a platform. The platform is arranged adjacent to the operator cab. The platform includes support members arranged one after the other in a linear array. Each support member is inclined with respect to a thickness direction of the platform to deflect a material spray coming off from one or more of the traction devices of the work machine during a movement of the one or more traction devices. Also, each support member defines a clearance with respect to an adjacent support member to allow see-through visibility through the platform from a portion associated with the operator cab.

20 Claims, 5 Drawing Sheets

(56) References Cited

U.S. PATENT DOCUMENTS

| | | | |
|---|---|---|---|
| 2007/0095977 A1 | 5/2007 | Gabrys | |
| 2012/0274101 A1 | 11/2012 | Myslak et al. | |
| 2014/0191537 A1* | 7/2014 | Bilbruck | E04C 2/425 |
| | | | 29/525.08 |
| 2018/0215232 A1* | 8/2018 | Arai | F01N 3/021 |
| 2018/0266077 A1* | 9/2018 | Konrardy | E02F 9/16 |

FOREIGN PATENT DOCUMENTS

| | | |
|---|---|---|
| CN | 215829520 U | 2/2022 |
| FR | 2839032 A1 | 10/2003 |
| JP | 2003054451 A | 2/2003 |
| JP | 2019078119 A * | 5/2019 |
| WO | 9001442 W | 2/1990 |

\* cited by examiner

CAB SYSTEM WITH MATERIAL DEFLECTION PLATFORM FOR WORK MACHINES

TECHNICAL FIELD

The present disclosure relates to cab systems for work machines, such as large mining trucks. More particularly, the present disclosure relates to a cab system having a platform that provides see-through visibility and also deflects material coming off from a traction device of the work machine.

BACKGROUND

Work machines, such as large mining trucks, are commonly used to transfer a payload between multiple locations of a worksite. Such work machines generally include an operator cab within which operators can be stationed to control one or more functions of the work machine, e.g., machine movement. It is common to provide a platform adjacent to the operator cab, e.g., for operators to access to and/or alight from the operator cab. Such platforms may be provided in the form of a grating.

If the platform includes a see-through grated structure and if one or more traction devices are located relatively close to (e.g., under) the platform, it is likely that the traction devices may lift and spray material (e.g., mud and debris from a ground surface) against the platform during machine motion. Such material spray can cause material to be spattered and collected within the recesses defined by the see-through grated structure, impacting visibility and/or a line of sight defined through the platform. The material can also travel through the platform to collect on surfaces of the operator cab and various other parts of the work machine. If deflectors are installed to deflect the material spray, the deflectors can also obstruct the visibility and/or a line of sight defined through the platform.

SUMMARY OF THE INVENTION

In one aspect, the disclosure relates to a cab system for a work machine. The cab system includes an operator cab and a platform. The platform is arranged adjacent to the operator cab. The platform includes support members arranged one after the other in a linear array. Each support member is inclined with respect to a thickness direction of the platform to deflect a material spray coming off from one or more of the traction devices of the work machine during a movement of the one or more traction devices. Also, each support member defines a clearance with respect to an adjacent support member to allow see-through visibility through the platform from a portion associated with the operator cab.

In another aspect, the disclosure is directed to a work machine. The work machine includes a power system, an apparatus to alter or haul earth, one or more traction devices, and a cab system. The traction devices may be powered by the power system to move and propel the work machine. The cab system includes an operator cab and a platform. The platform is arranged adjacent to the operator cab and includes support members arranged one after the other in a linear array. Each support member is inclined with respect to a thickness direction of the platform to deflect a material spray coming off from one or more of the traction devices during a movement of the traction devices. Further, each support member defines a clearance with respect to an adjacent support member to allow see-through visibility through the platform from a portion associated with the operator cab.

DETAILED DESCRIPTION

Reference will now be made in detail to specific embodiments or features, examples of which are illustrated in the accompanying drawings. Generally, corresponding reference numbers may be used throughout the drawings to refer to the same or corresponding parts, e.g., 1, 1', 1", 101 and 201 could refer to one or more comparable components used in the same and/or different depicted embodiments.

Figure 1:
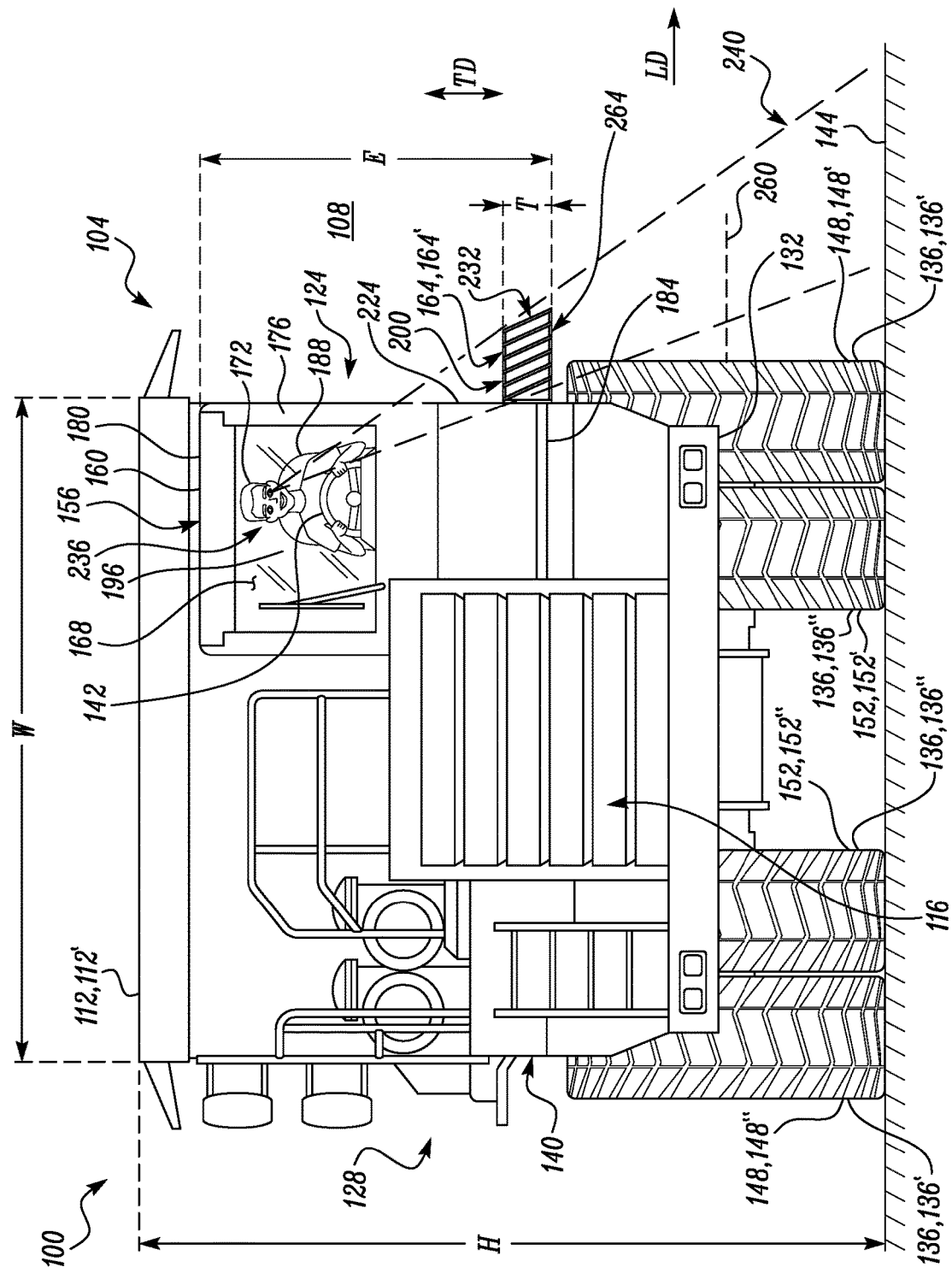
FIG. 1 is a front view of an exemplary work machine, in accordance with one or more aspects of the present disclosure.
Figure 2:
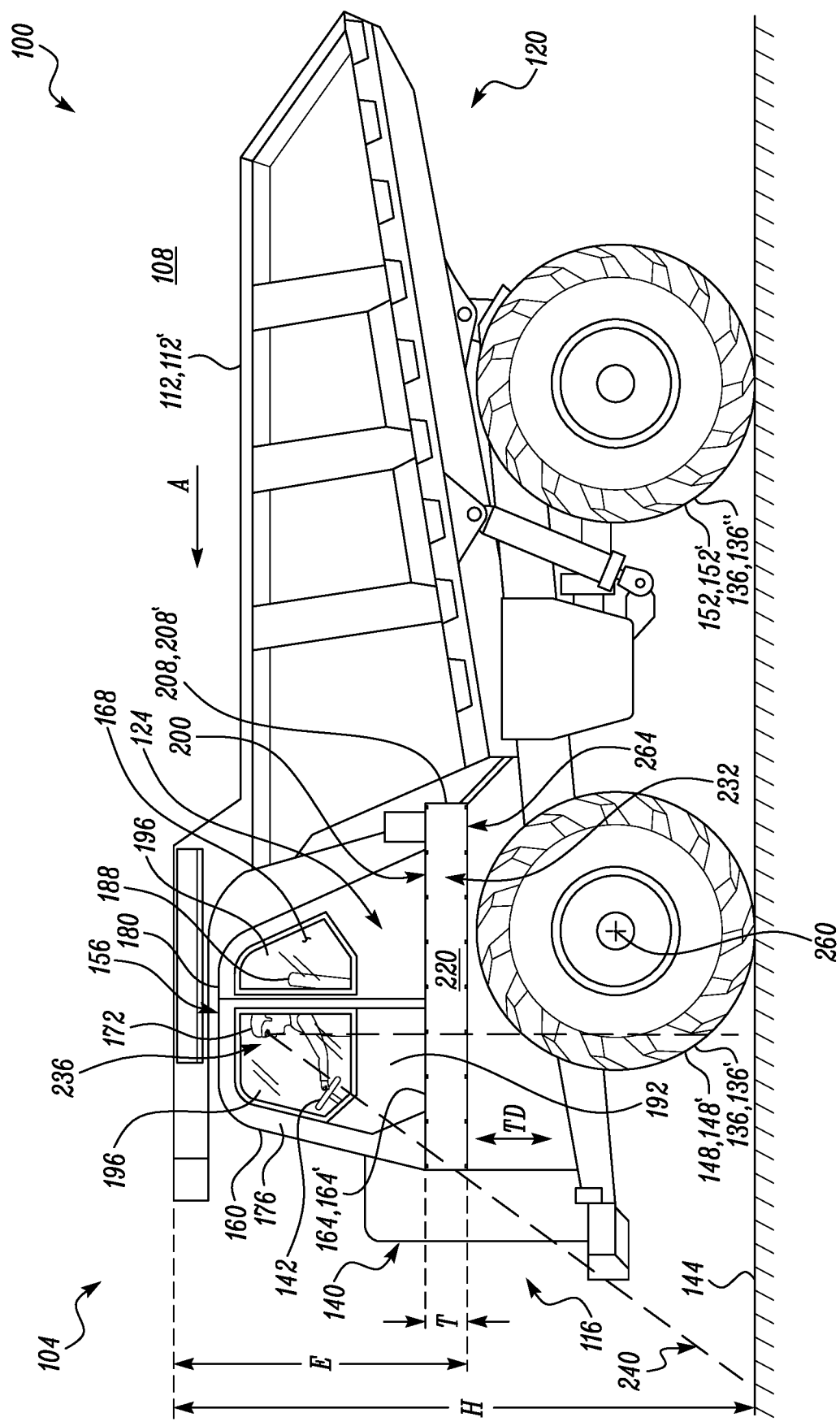
FIG. 2 is a side of the work machine of FIG. 1, in accordance with one or more aspects of the present disclosure.

Referring to FIGS. 1 and 2, a work machine 100 is shown. The work machine 100 may be a mining machine and may exemplarily embody a dump truck or a large mining truck 104 operable at a worksite 108. The worksite 108 may include various sites or locations, such as load locations and dump locations (not shown). Load locations may be locations of the worksite 108 from where the work machine 100 may receive a payload (e.g., ores, boulders, sand, dirt, gravel, etc.), and dump locations may be locations of the worksite 108 to where the work machine 100 may traverse up to so as to release the payload.

As part of an exemplary work cycle, the work machine 100 may repeatedly traverse back and forth between said locations at the worksite 108. For example, the work machine 100 may receive the payload from a load location, traverse in a forward direction (see direction, A, FIG. 2) from the load location to a dump location, release and/or dump the payload at the dump location and traverse back to the load location or (one or more similar other load locations) to receive additional payload. In that manner, the work cycle can be repeated for a desired number of instances. The work machine 100 may include an apparatus 112 to alter or haul earth, such as, but not limited to, a dump body 112' which may be tiltable to receive and release the payload.

Although references and illustrations of the large mining truck 104 are used in the present disclosure, aspects of the present disclosure may also be applicable to other work machines, such as underground mining machines, excavators, articulated dump trucks, haul trucks, loaders, wheeled machines, crawler machines, and the like machines, in which one or more operator cabs and/or cab systems may be provided, e.g., to station one or more operators of the work machine 100. References and illustrations of the work machine 100, e.g., as a dump machine or the large mining truck 104, in the present disclosure is to be viewed as being exemplary. Further, examples of the worksite 108 may include, but not limited to, a mine site, an underground mine site, a construction site, a landfill, a quarry, and the like.

The work machine 100 may define a front end 116 and a rear end 120 (see FIG. 2). The rear end 120 may be located opposite to the front end 116. The front end 116 may lead the rear end 120 when the work machine 100 is travelling in the forward direction (e.g., direction, A) (see FIG. 2). A left hand side 124 of the work machine 100 and a right hand side 128 of the work machine 100 may be defined, as well. Each of the left hand side 124 and the right hand side 128 may be defined on the lateral opposing sides of the work machine 100. Said left hand side 124 and right hand side 128 can be relatable and understood when viewing the work machine 100 from the rear end 120 towards the front end 116. The work machine 100 may also define a height, H.

Further, the work machine 100 may include a chassis or a main frame 132 and multiple traction devices (see traction devices 136). The traction devices 136 may include front traction devices 136' that are located towards the front end 116 of the work machine 100 and rear traction devices 136" that are located towards the rear end 120 of the work machine 100. The work machine 100 may further include a power system 140, which may include a power source (not shown) such as, but not limited to, an internal combustion engine and/or a battery, to provide motive power to the traction devices 136, and, optionally, to one or more other systems/sub-systems of the work machine 100. By providing motive power to the traction devices 136, the traction devices 136 can move (e.g., rotate) with respect to a ground surface 144 of the worksite 108, thus also enabling the work machine 100 to move with respect to the ground surface 144 and travel between the various locations of the worksite 108.

The traction devices 136 of the work machine 100 (i.e., each of the front traction devices 136' and the rear traction devices 136") may support the main frame 132 on the ground surface 144 of the worksite 108. The front traction devices 136' may include a set of front wheels 148 and the rear traction devices 136" may include a set of rear wheels 152. In some embodiments, the traction devices 136 can include crawler tracks either alone or in combination with one or more of the set of front wheels 148 and/or the set of rear wheels 152. The set of front wheels 148 may support a front portion of the main frame 132 on the ground surface 144, while the set of rear wheels 152 may support a rear portion of the main frame 132 on the ground surface 144.

As exemplarily shown, the set of front wheels 148 may be disposed along a width, W, of the work machine 100 such that at least one front wheel (e.g., see left front wheel 148) of the set of front wheels 148 can occupy a position at or towards the left hand side 124 of the work machine 100 and at least one another front wheel (e.g., see right front wheel 148") of the set of front wheels 148 can occupy a position at or towards the right hand side 128 of the work machine 100. Similarly, the set of rear wheels 152 may also be disposed along the width, W, of the work machine 100 such that at least one rear wheel (e.g., see left rear wheel 152') of the set of rear wheels 152 can occupy a position at or towards the left hand side 124 of the work machine 100 and at least one another rear wheel (e.g., see right rear wheel 152") of the set of rear wheels 152 can occupy a position at or towards the right hand side 128 of the work machine 100.

Also, the work machine 100 may include a cab system 156. The cab system 156 may include an operator cab 160 and a platform 164. As exemplarily shown, the operator cab 160 may be located at or towards the left hand side 124 of the work machine 100. Further, the operator cab 160 may be arranged or acquire a position which is above (e.g., at least partially above) the left front wheel 148' when viewed along the height, H, of the work machine 100. The operator cab 160 may define an internal volume 168 which may be utilized to station one or more operators (e.g., see operator 172) on the work machine 100. The term 'operator' used in the present disclosure may mean and/or include single or multiple manual operators and/or systems (e.g., cameras, LIDARs, three-dimensional sensors) that may exemplarily provide perceivable visuals of and/or around the work machine 100 and which may optionally be remotely accessible.

The operator cab 160 may be formed by multiple panels (e.g., sheet metal panels), which may include a number of side panels (e.g., see side panel 176). Further, the operator cab 160 may also include a roof portion 180 and a floor portion 184. Each of the side panels (e.g., side panel 176), the roof portion 180, and the floor portion 184, may be assembled together to surround and define the internal volume 168 of the operator cab 160.

Further, the operator cab 160 may include one or more operator seats (e.g., see operator seat 188) and various input devices, such as joysticks, control panels, and levers, arranged within the internal volume 168. The input devices may be accessed to control and operate various systems and/or sub-systems of the work machine 100, e.g., the power system 140, a steering system 142 to steer the traction devices 136 (and thus the work machine 100), etc. The operator cab 160 may also include provisions such as one or more gates (e.g., see gate 192) by which the operator 172 can access and/or exit the internal volume 168. Further, the operator cab 160 may also include see through regions 196, such as windows and windshields, through which the operator 172 stationed within the internal volume 168 can view and/or inspect an environment and/or the ground surface 144 located outside the operator cab 160. The operator cab 160 may define an elevation, E, defined along the height, H, of the work machine 100.

The platform 164 may be positioned or arranged adjacent to the operator cab 160, as shown, and may be used as a walkway surface 200 and/or a walkway platform 164' by the operator 172. As an example, the operator 172 may use the platform 164 to access and alight from the operator cab 160 (i.e., the internal volume 168 of the operator cab 160). Therefore, in some embodiments, the platform 164 may be positioned or arranged adjacent to the floor portion 184 of the operator cab 160. In some embodiments, the platform 164 may be located (e.g., generally disposed) at the level of the floor portion 184 so as to ease out operator movement between the floor portion 184 and the platform 164. The term 'generally' means that the platform 164 can be disposed relatively higher or relatively lower than the floor portion 184 to allow the operator 172 to either step-up or step-down with respect to the floor portion 184 to transition over to the platform 164 from the floor portion 184. Effectively, the platform 164 need not necessarily sit flush with the floor portion 184.

Given that the operator cab 160 may be located above the left front wheel 148', the platform 164 may also acquire a position above (e.g., partially above) the left front wheel 148'. As shown in FIGS. 1 and 2, and also in FIGS. 3 through 5, the platform 164 may define a thickness, T, and a corresponding thickness direction, TD, associated with a direction in which the thickness, T, extends or is defined. The thickness, T, and/or the thickness direction, TD, may be defined along the elevation, E, of the operator cab 160. An axis 204 may be defined along the thickness direction, TD, as shown.

It will be appreciated that the work machine 100 can include various parts, e.g., stairs that may allow the operator 172 to reach up to the platform 164, associated railings, and the like structures. Such parts may surround and/or lie adjacent to the platform 164. However, for clarity and to also retain focus on the structure and configuration of the platform 164, such parts have been omitted from the view of FIGS. 1 and 2 and are not described in the present disclosure, as they may be contemplated and applied by someone in the art based on the description of the present disclosure.

Figure 3:
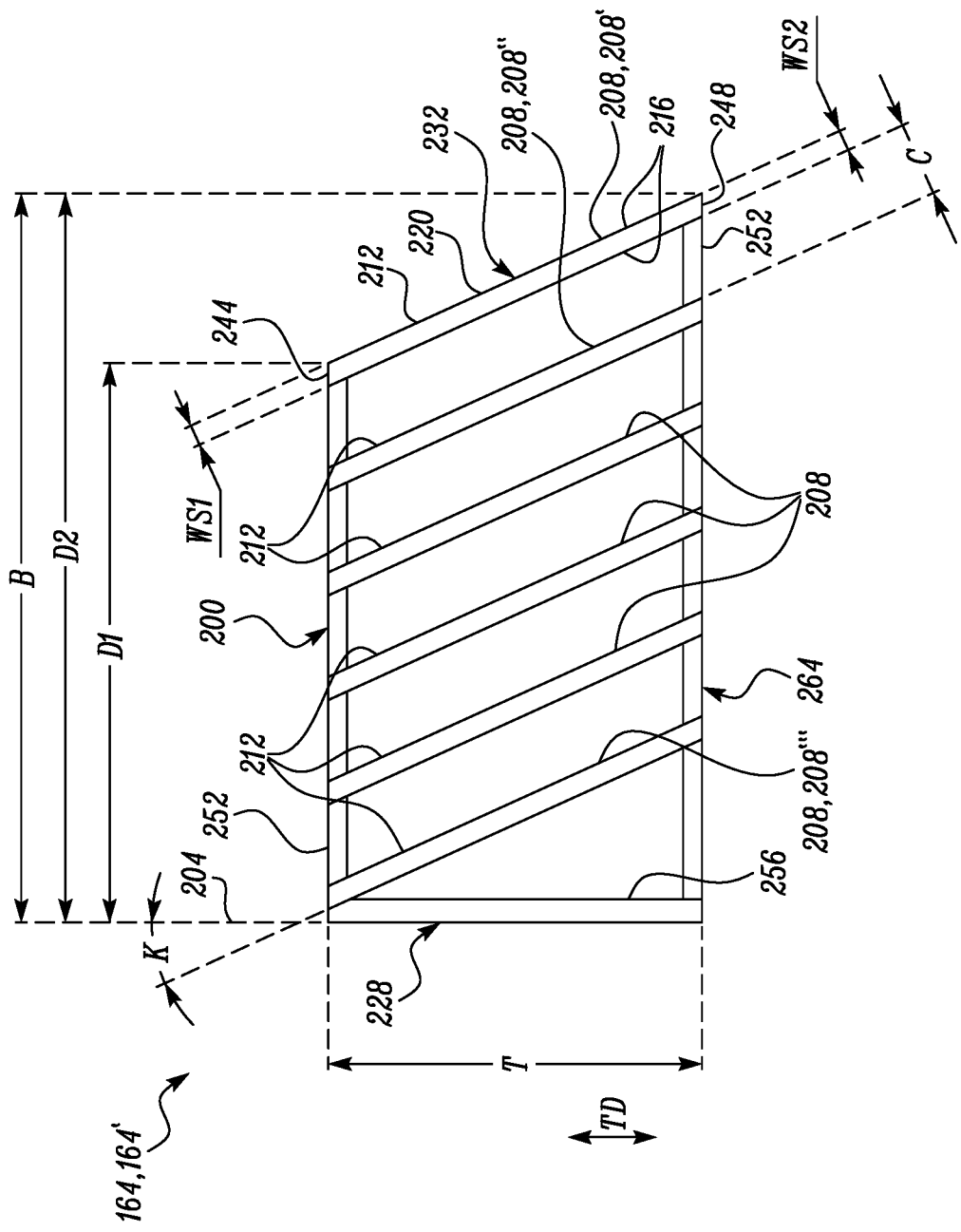
FIGS. 3 through 5 are various views of a platform applied in conjunction with an operator cab of the work machine, in accordance with one or more aspects of the present disclosure.
Figure 4:
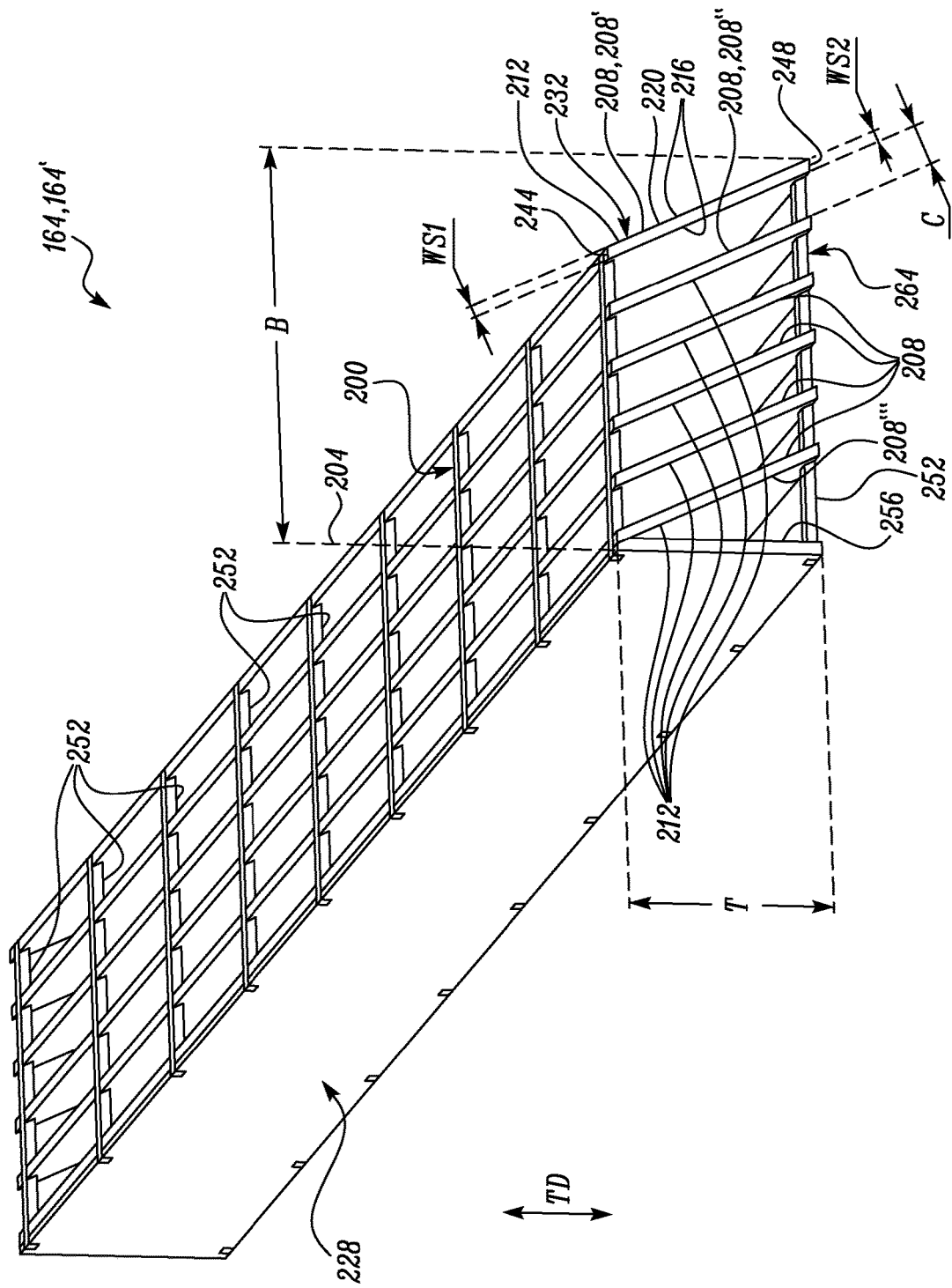
Figure 5:
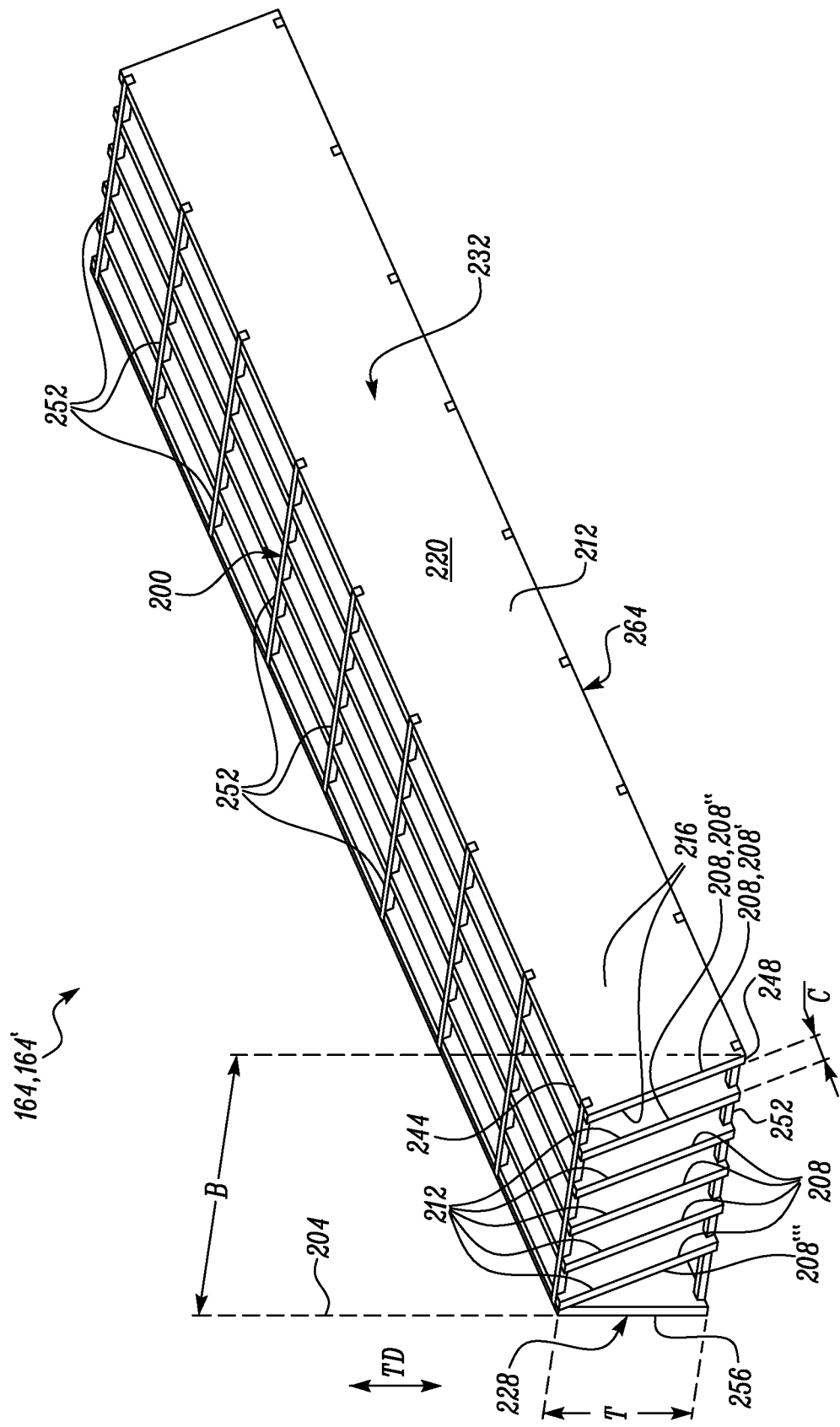

Referring to FIGS. 3 through 5, and also in conjunction with FIGS. 1 and 2, the platform 164 may include and/or be formed by a number of support members 208. Although not limited, the support members 208 may be in the form of plates 212, each defining flat or planar surfaces on its opposing sides—e.g., see planar surfaces 216 for support member 208'. Also, as an example, each support member 208 may extend along a corresponding plane (e.g., see plane 220 for support member 208') defining said planar surfaces 216. Although not limited, the support members 208 may be arranged parallel to each other. Also, in some embodiments, each support member 208 may be formed from a metallic or a non-metallic material, e.g., high-strength steel, an alloy, wood, and fiberglass. The support members 208 may be arranged in the form of an array, e.g., a linear array, to form the platform 164. As an example, the array (e.g., the linear array) may start from an end surface 224 of the operator cab 160 (and/or from a first end 228 of the platform 164) and extend in a direction outwards and away from the operator cab 160 (e.g., to define a second end 232 of the platform 164). The direction may be a lateral direction, LD, (e.g., a leftward lateral direction, see FIG. 1) defined with respect to the operator cab 160. Also, each support member 208 may be inclined with respect to the axis 204 or the thickness direction, TD, associated with the thickness, T, of the platform 164.

Further, each support member 208 of the platform 164 may define a clearance, C, with respect to an adjacent support member 208 of the platform 164—e.g., only clearance, C, defined between the support member 208' and support member 208" of the platform 164 is shown. In so doing, an array of intermittent clearances, i.e., clearances, C, are formed or defined throughout the platform 164 or throughout an extension of the platform 164 from the first end 228 to the second end 232. The clearances, C, allow see-through visibility through the platform 164 (e.g., through the thickness, T, of the platform 164).

Given the angled or inclined arrangement of the support members 208 with respect to the thickness direction, TD, the see-through visibility may also be attained angularly with respect to the thickness direction, TD. In other words, the operator 172 may be able to view through the platform 164 (e.g., towards the ground surface 144) when the operator 172's line of sight 240 is angled or inclined with respect to the elevation, E, of the operator cab 160 (and is also aligned with the support members 208).

Although not limited, the line of sight 240 may originate from a portion 236 associated with the operator cab 160—e.g., at or around the operator seat 188, extend leftwards (or towards the lateral direction, LD) of the work machine 100, pass through one or more of the see through regions 196, and diverge towards the ground surface 144. In some embodiments, the clearance, C, defined between each support member 208 and the adjacent support member 208 may be equal throughout the platform 164. In other words, the support members 208 may be equally spaced apart to form the platform 164 and/or the intermittent clearances, i.e., clearances, C, defined by the platform 164 may correspondingly be of equal measure.

Further, each support member 208 may define a first edge 244 and a second edge 248 (see exemplary annotations corresponding to the support member 208') (e.g., FIG. 3).

The second edge 248 may be located opposite to the first edge 244. Also, the first edge 244 may be located above the second edge 248 along the elevation, E, of the operator cab 160 or along the thickness direction, TD, of the platform 164. It may be noted that each support member 208 may be inclined with respect to the thickness direction, TD, associated with the thickness, T, of the platform 164 such that a distance, D1, between the first edge 244 and the operator cab 160 defined along the lateral direction, LD, is smaller or shorter than a distance, D2, between the second edge 248 and the operator cab 160 defined along the lateral direction, LD.

Also, the first edge 244 may define a width span, WS1, and the second edge 248 may define a width span, WS2. The width span, WS1, may be equal to the width span, WS2. However, in some embodiments, it is possible that the width span, WS2, defined by the second edge 248 may be smaller or narrower than the width span, WS1, defined by the first edge 244. Such difference in the width spans, WS1 and WS2, may increase visibility across the thickness, T, of the platform 164, e.g., when viewing through the platform 164 in a direction defined from the first edge 244 towards the second edge 248. In alternate embodiments, the width span, WS2, defined by the second edge 248 may be larger or wider than the width span, WS1, defined by the first edge 244.

Moreover, the inclination defined by each support member 208 of the platform 164 with respect to the axis 204 or to the thickness direction, TD, may mean that each support member 208 defines an angle (referred to as an inclined angle, K) with respect to the axis 204—e.g., see inclined angle, K, defined between support member 208''' and the axis 204 in FIG. 3. This inclined angle, K, may range between 15 degrees to 45 degrees. If the support members 208 are parallel to one another, each support member 208 may define the same inclined angle, K, with respect to the axis 204.

It is possible however that, in some cases, the inclined angles, K, defined correspondingly by the support members 208 with respect to the axis 204, may differ from each other. For example, the inclined angle, K, may increase (e.g., progressively increase) for each successive support member 208 from the first end 228 to the second end 232, with the support member 208''' exemplarily defining the smallest inclined angle, K, and the support member 208' exemplarily defining the largest inclined angle, K. Such an increase in the inclined angle, K, of the support members 208 may accommodate the exemplary line of sight 240 (e.g., of the operator 172 stationed within the internal volume 168 of the operator cab 160) which may diverge towards the ground surface 144, as discussed above, or which may expand as a sector of a circle from its point of origin (e.g., from the portion 236) of the operator cab 160. Effectively, the increasing angles of the support members 208 when moving away from the operator cab 160 in the lateral direction, LD, may help the support members 208 align with the line of sight 240 or the operator 172's field of view.

In some embodiments, the platform 164 may include one or more cross-structures or cross beams 252 (only few are marked in the accompanying FIGS. 1 through 5). The cross beams 252 may be disposed across a breadth, B, of the platform 164 to connect to each support member 208 and retain the platform 164 as a single, unitary unit. In some embodiments, the cross beams 252 may be integrally formed with the support members 208 or may be coupled with the support members 208, e.g., by way of welding or other fastening techniques now known or in the future developed, e.g., bolting.

The platform 164 may also include a mounting structure 256. The mounting structure 256 may be used to mount the platform 164 against the end surface 224 of the operator cab 160. Although not limited, the mounting structure 256 may be a plate-shaped structure and may be similar to and/or include one or more characteristics of the support members 208. However, the mounting structure 256 may be aligned with the axis 204 to be mountable against the end surface 224 and may not define an inclined angle with respect to the axis 204—e.g., an angle between the mounting structure 256 and the axis 204 may be 0 degrees in some cases. An exemplary coupling of the mounting structure 256 to the end surface 224 may be attained by way of using any conventional fastening means, e.g., by use of threaded fasteners, welding, and/or the like techniques, now known or in the future developed. In some embodiments, the platform 164, e.g., the support members 208, the cross beams 252, and/or the mounting structure 256, may include an outer layer of a dust repellent coating.

INDUSTRIAL APPLICABILITY

During operations, as the work machine 100 may travel over the ground surface 144, the traction devices 136 (including the left front wheel 148') may engage the ground surface 144 and rotate about its axis (e.g., wheel axis 260, see FIGS. 1 and 2). As the left front wheel 148' may spin or rotate, an engagement of the left front wheel 148' with the ground surface 144 can cause an amount of material (e.g., muddy soil, debris, and the like) to be lifted from the ground surface 144 and be sprayed around the wheel axis 260 or the left front wheel 148'. As a result, during said rotation of the left front wheel 148', a portion of the material spray released from the left front wheel 148' may fall and be spattered against the platform 164 (e.g., an underside 264 of the platform 164 as the platform 164 may be located above the left front wheel 148').

As each support member 208 may be inclined with respect to the thickness direction, TD, of the platform 164, each support member 208 can obstruct the progression of the material spray and may bar the material's furtherance or entry into the intermittent clearances, i.e., clearances, C, defined by the platform 164. Such obstruction provided by the support members 208 ensures that, for the most part, the intermittent clearances, i.e., clearances, C, remain clog free. More particularly, the obstruction provided by the support members 208 causes the platform 164 to effectively deflect the material spray coming off from the left front wheel 148' during a movement of the left front wheel 148' and/or the work machine 100. Accordingly, the material may be restricted to travel or reach up to various parts of the work machine 100, such as cameras, transparent surfaces including windows, windshields, and the like, of the operator cab 160 of the work machine 100.

Because the intermittent clearances can remain clog free, a viewability (e.g., from the portion 236 of the operator cab 160 such as by the operator 172 from the operator seat 188) through the platform 164 can remain free from any blockage or visual interruptions. Therefore, the inclinations of the support members 208 with respect to the thickness direction, TD, also helps the operator 172 (e.g., when the operator 172 is seated on the operator seat 188) to view through the platform 164 with ease and perceive a nature and/or quality of the ground surface 144 (i.e., whether the ground surface 144 has any obstacles to the movement of the work machine 100 or not).

Such perception can be attained even when the work machine 100 may be moving and/or the left front wheel 148' is lifting and spraying material around the wheel axis 260 or when the work machine 100 is stationery with respect to the ground surface 144. Moreover, such a perception is possible and applicable as the operator 172's line of sight 240 can be aligned with the inclined angles (e.g., inclined angle, K) of the support members 208. The inclined angle, K, ranging between 15 degrees to 45 degrees, as noted above, may be applicable for a large mining truck, such as the large mining truck 104 exemplarily discussed in the present disclosure. Based on the description provided, those of skill in the art may contemplate different angular ranges for different configurations of the work machine 100, different operator cabs of the work machine 100, and/or altogether different work machines and/or different operator cabs.

Further, it may be noted that the line of sight 240 may differ in different machines and/or the same may differ based on different conditions and/or requirements of the work machine 100. For example, and in some embodiments, the line of sight 240 may be directed towards a mirror or a scope which may in turn be directed towards the platform 164 to enable the operator 172 to view through the platform 164 (in the manner as has been described above) by solely viewing the mirror or scope.

The enhanced visibility through the platform 164 allows broader platforms (e.g., which can span further along the lateral direction, LD) to be installed adjacent to the operator cab 160, thus making the platform 164 spacious for operator stationing and movement. This in turn promotes operator comfort, as against conventional platforms which offer restricted space and are to be limited in its breadth to mitigate blind spots around the work machine 100. Further, with the platform 164 effectively deflecting the material spray, an installation of separate deflectors or spray guards on or under the platform 164 may not be needed, thus also reducing the number of parts needed on the work machine 100 and also saving associated costs.

Unless explicitly excluded, the use of the singular to describe a component, structure, or operation does not exclude the use of plural such components, structures, or operations or their equivalents. The use of the terms "a" and "an" and "the" and "at least one" or the term "one or more," and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

It will be apparent to those skilled in the art that various modifications and variations can be made to the method and/or system of the present disclosure without departing from the scope of the disclosure. Other embodiments will be apparent to those skilled in the art from consideration of the specification and practice of the method and/or system disclosed herein. It is intended that the specification and examples be considered as exemplary only, with a true scope of the disclosure being indicated by the following claims and their equivalent.

What is claimed is:

1. A cab system for a work machine, the cab system comprising:
   an operator cab; and
   a platform arranged adjacent to the operator cab, the platform including a plurality of support members arranged one after the other in a linear array starting from the operator cab and extending in a direction outwards and away from the operator cab, wherein,
      each support member of the plurality of support members is inclined with respect to a thickness direction of the platform to deflect a material spray coming off from one or more traction devices of the work machine during a movement of the one or more traction devices, and
      each support member of the plurality of support members defines a clearance with respect to an adjacent support member of the plurality of support members to allow see-through visibility through the platform from a portion associated with the operator cab.

2. The cab system of claim 1, wherein the direction is a lateral direction defined with respect to the operator cab.

3. The cab system of claim 2, wherein
   each support member of the plurality of support members defines a first edge and a second edge opposite to the first edge, the first edge being located above the second edge along an elevation of operator cab,
      wherein a distance between the first edge and the operator cab defined along the lateral direction is smaller than a distance between the second edge and the operator cab defined along the lateral direction.

4. The cab system of claim 1, wherein the operator cab is configured to be arranged above the one or more traction devices along a height of the work machine.

5. The cab system of claim 1, wherein the platform is a walkway platform and each support member of the plurality of support members is formed from a metallic material.

6. The cab system of claim 1, wherein the clearance defined between each support member and the adjacent support member is equal throughout the platform.

7. The cab system of claim 1, wherein
   each support member of the plurality of support members extends along a corresponding plane to define planar surfaces, and
   each support member of the plurality of support members defines an angle with respect to an axis defined along the thickness direction, the angle ranging between 15 degrees to 45 degrees.

8. The cab system of claim 1, wherein the plurality of support members are arranged parallel to each other.

9. The cab system of claim 1 further including one or more cross beams disposed across a breadth of the platform to connect to each support member of the plurality of support members and retain the platform as a unitary unit, wherein the one or more cross beams are integrally formed with the plurality of support members.

10. The cab system of claim 1, wherein the platform includes a dust repellent coating.

11. A work machine, comprising:
    a power system;
    an apparatus to alter or haul earth;
    one or more traction devices powered by the power system to move and propel the work machine;
    a cab system, including:
       an operator cab; and
       a platform arranged adjacent to the operator cab, the platform including a plurality of support members arranged one after the other in a linear array extending in a direction outwards and away from the operator cab, wherein,
          each support member of the plurality of support members is inclined with respect to a thickness direction of the platform to deflect a material spray coming off from the one or more traction devices during a movement of the one or more traction devices, and
          each support member of the plurality of support members defines a clearance with respect to an adjacent support member of the plurality of support members to allow see-through visibility through the platform from a portion associated with the operator cab.

12. The work machine of claim 11, wherein the direction is a lateral direction defined with respect to the operator cab.

13. The work machine of claim 12, wherein
    each support member of the plurality of support members defines a first edge and a second edge opposite to the first edge, the first edge being located above the second edge along an elevation of operator cab,
       wherein a distance between the first edge and the operator cab defined along the lateral direction is smaller than a distance between the second edge and the operator cab defined along the lateral direction.

14. The work machine of claim 11, wherein the operator cab is arranged above the one or more traction devices along a height of the work machine.

15. The work machine of claim 11, wherein the platform is a walkway platform and each support member of the plurality of support members is formed from a metallic material.

16. The work machine of claim 11, wherein the clearance defined between each support member and the adjacent support member is equal throughout the platform.

17. The work machine of claim 11, wherein
    each support member of the plurality of support members extends along a corresponding plane to define planar surfaces, and
    each support member of the plurality of support members defines an angle with respect to an axis defined along the thickness direction, the angle ranging between 15 degrees to 45 degrees.

18. The work machine of claim 11, wherein the plurality of support members are arranged parallel to each other.

19. The work machine of claim 11 further including one or more cross beams disposed across a breadth of the platform to connect to each support member of the plurality of support members and retain the platform as a unitary unit, wherein the one or more cross beams are integrally formed with the plurality of support members.

20. The cab system of claim 1, wherein the platform is arranged below the operator cab and at least partially above a traction device, of the one or more traction devices, along a height of the work machine.

* * * * *